(12) United States Patent
Toizumi et al.

(10) Patent No.: US 11,176,420 B2
(45) Date of Patent: Nov. 16, 2021

(54) IDENTIFICATION DEVICE, IDENTIFICATION METHOD, AND STORAGE MEDIUM

(71) Applicant: NEC CORPORATION, Tokyo (JP)

(72) Inventors: Takahiro Toizumi, Tokyo (JP); Kazutoshi Sagi, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/769,135

(22) PCT Filed: Dec. 14, 2017

(86) PCT No.: PCT/JP2017/044899
§ 371 (c)(1),
(2) Date: Jun. 2, 2020

(87) PCT Pub. No.: WO2019/116497
PCT Pub. Date: Jun. 20, 2019

(65) Prior Publication Data
US 2021/0224600 A1 Jul. 22, 2021

(51) Int. Cl.
*G06K 9/62* (2006.01)
*G06T 7/73* (2017.01)

(52) U.S. Cl.
CPC ........... *G06K 9/6257* (2013.01); *G06K 9/623* (2013.01); *G06K 9/6268* (2013.01); *G06T 7/73* (2017.01); *G06T 2207/10028* (2013.01)

(58) Field of Classification Search
CPC .... G06K 9/6257; G06K 9/623; G06K 9/6268; G06T 7/73; G06T 2207/10028
See application file for complete search history.

(56) References Cited

U.S. PATENT DOCUMENTS 7,831,090 B1 * 11/2010 Krishnan ............. G06K 9/6211
382/154
8,391,551 B2 * 3/2013 Ogawa ................ G06K 9/6255
382/103
(Continued)

FOREIGN PATENT DOCUMENTS

JP 11-015973 A 1/1999
JP 2004-062719 A 2/2004
(Continued)

OTHER PUBLICATIONS

Nash et al., "The shape variational autoencoder: A deep generative model of part-segmented 3D objects" 9pp. 1-12) (Year: 2017).*
(Continued)

*Primary Examiner* — Manav Seth
(74) *Attorney, Agent, or Firm* — Sughrue Mion, PLLC

(57) ABSTRACT

An identification device according to one embodiment comprises: an acquisition unit that uses an encoder configured to derive, from data in which a single subject under different conditions has been recorded, feature values as a first feature value derived from data in which a subject to be identified has been recorded; a conversion unit that generates a second feature value by carrying out conversion using the conversion parameter on the first feature value; a discrete classification unit that carries out discrete classification on each of a plurality of third feature values including the second feature value and generates a plurality of discrete classification results indicating the results of the classification; a result derivation unit that derives, on the basis of the plurality of discrete classification results, identification result information; and an output unit that outputs the identification result information.

20 Claims, 12 Drawing Sheets

(56) References Cited

U.S. PATENT DOCUMENTS

| | | | | |
|---|---|---|---|---|
| 8,630,456 | B2* | 1/2014 | Asahara | G06T 7/11 |
| | | | | 382/103 |
| 8,824,733 | B2* | 9/2014 | Schamp | G06T 7/11 |
| | | | | 382/103 |
| 8,861,834 | B2* | 10/2014 | Fujieda | G01B 11/272 |
| | | | | 382/154 |
| 9,830,511 | B2* | 11/2017 | Saptharishi | G06T 7/246 |
| 10,579,909 | B2* | 3/2020 | Chen | G06K 9/6286 |
| 10,586,370 | B2* | 3/2020 | Lombardi | G06T 17/20 |
| 10,846,589 | B2* | 11/2020 | Patel | G06N 3/0472 |
| 11,062,454 | B1* | 7/2021 | Cohen | G01S 17/89 |
| 2006/0039600 | A1 | 2/2006 | Solem et al. | |
| 2010/0098324 | A1* | 4/2010 | Fujieda | G01B 11/272 |
| | | | | 382/154 |
| 2013/0094733 | A1 | 4/2013 | Nosato et al. | |
| 2015/0029097 | A1* | 1/2015 | Craig | G06K 9/00342 |
| | | | | 345/156 |
| 2018/0046884 | A1* | 2/2018 | Chen | G06K 9/6257 |
| 2018/0322623 | A1* | 11/2018 | Memo | G06N 3/084 |
| 2019/0012802 | A1* | 1/2019 | Liu | G06K 9/00664 |
| 2019/0122375 | A1* | 4/2019 | Wang | G06K 9/6211 |
| 2019/0147220 | A1* | 5/2019 | Mccormac | G06K 9/00208 |
| | | | | 382/103 |
| 2019/0244348 | A1* | 8/2019 | Buckler | G06T 7/11 |
| 2019/0304168 | A1* | 10/2019 | Korb | G06T 15/20 |
| 2020/0058137 | A1* | 2/2020 | Pujades | G06T 7/75 |
| 2020/0402248 | A1* | 12/2020 | Siver | H04N 13/271 |

FOREIGN PATENT DOCUMENTS

| | | |
|---|---|---|
| JP | 2009-109419 A | 5/2009 |
| JP | 2013-008364 A | 1/2013 |

OTHER PUBLICATIONS

Extended European Search Report for EP Application No. EP17934671.3 dated Nov. 24, 2020.

Girdhar Rohit et al: "Learning a Predictable and Generative Vector Representation for Objects", Sep. 17, 2016 (Sep. 17, 2016), 12th European Conference on Computer Vision, ECCV 2012; [Lecture Notes in Computer Science], Springer Berlin Heidelberg, Berlin Germany, pp. 484-499, XP047565732, ISSN: 0302-9743, ISBN: 978-3-642-04427-4, [retrieved on Sep. 17, 2016].

Yuta Ashihara, et al., "Middle layers sharing for transfer learning to predict rotating image in DeepLearning",, IPSJ Technical Report, ICS 2016-ICS-182 [online] the Internet: <URL:https://ipsj.ixsq.nii.ac.jp/ej/?action=repository_uri&item_id=157634&file_id=1&file_no=1> Feb. 24, 2016, pp. 1 to 8.

International Search Report for PCT/JP2017/044899 dated Feb. 13, 2020 [PCT/ISA/210].

Written Opinion for PCT/JP2017/044899 dated Feb. 13, 2020 [PCT/ISA/210].

* cited by examiner

Fig. 3

$$S_k = \begin{pmatrix} 0 & \cdots & 0 & 1 & & 0 \\ \vdots & \ddots & \vdots & & \ddots & \\ 0 & \cdots & 0 & 0 & & 1 \\ 1 & 0 & 0 & \cdots & & 0 \\ \ddots & & \vdots & \ddots & & \vdots \\ 0 & 1 & 0 & \cdots & & 0 \end{pmatrix}$$

- $kr$ COLUMNS | $n-kr$ COLUMNS
- $n-kr$ ROWS
- $kr$ ROWS

IDENTIFICATION DEVICE, IDENTIFICATION METHOD, AND STORAGE MEDIUM

CROSS REFERENCE TO RELATED APPLICATIONS

This application is a National Stage of International Application No. PCT/JP2017/044899 filed Dec. 14, 2017.

TECHNICAL FIELD

The present disclosure relates to an identification technique to be performed by a computer.

BACKGROUND ART

Using a variable that well represents a feature of a target, when a classifier for performing classification of targets indicated in data is configured, leads to enhancement of classification accuracy. As a method for deriving, from input data, a variable that well represents a feature of a target, a method of employing an autoencoder is well known.

A typical autoencoder is constituted of an input layer, an intermediate layer, and an output layer. The typical autoencoder determines, based on comparison of data to be input to the input layer with data to be output by the output layer, a weight and a bias for use in encoding (specifically, conversion from data in the input layer into data in the intermediate layer), and a weight and a bias for use in decoding (specifically, conversion from data in the intermediate layer into data in the output layer) into optimum values.

Data to be output in the intermediate layer by encoding using a weight and a bias determined as a result of learning by the autoencoder can be regarded as information that well represents a feature of a target. The data to be output in the intermediate layer are generally referred to as a "feature value vector" or a "feature vector", or simply referred to as a "feature value" or a "feature". In the present disclosure, the data to be output in the intermediate layer are also referred to as a "set of values of latent variables" or a "latent variable vector".

PTL 1 is a literature describing a technique associated with the invention of the present application. PTL 1 discloses an image processing device for converting a size, a rotational angle, a position, and the like of a target within an image into a state suitable for performing identification (in other words, normalizing). A magnitude of conversion for normalization is determined by a coefficient to be determined based on a relation between a vector (mapping vector) when data of an image which has undergone coarse graining are mapped in a space F by non-linear conversion, and a partial space including a base vector representing a feature of a learning sample. PTL 1 describes that, when an autoencoder is employed in this technique, an output of an output layer of the autoencoder is associated with a mapping image by the non-linear conversion, and an output of an intermediate layer is associated with projection of a mapping vector into a partial space.

CITATION LIST

Patent Literature

[PTL 1] Japanese Unexamined Patent Application Publication No. 2004-62719

SUMMARY OF INVENTION

Technical Problem

Feature value vectors to be derived by a neural network optimized by a general autoencoder are not necessarily represented to be associated with one another with respect to a same target in different forms. For example, it is assumed that a classifier for classifying chairs captured in images into a chair by using a feature value vector to be derived with use of a neural network optimized by a general autoencoder is generated by learning in which only images of chairs captured in a direction illustrated in FIG. 1A are used as training data. In such a case, the generated classifier may not identify, as the chair, a chair captured in a direction illustrated in FIG. 1B, or at an angle illustrated in FIG. 1C. This is because, even in a same target, feature value vectors that are not related to one another may be derived from data in which the target is recorded in forms different from one another (in the above-described example, a direction or an angle).

Generally, in order to correctly identify a target which may be captured in various forms, it is necessary to use training data covering various forms in learning a classifier. However, it is not always easy to prepare training data covering various forms.

The technique described in PTL 1 is a technique for enhancing performance of identifying a target which may be captured in various forms by normalizing an image. However, it is necessary to derive a function for performing the normalization by learning in which images of a target captured in various forms are used as training data. Since a pattern identification unit 100 for performing identification of a target uses a normalized image as a target to be identified, there is no guarantee that the pattern identification unit 100 correctly identifies a target captured in a form that is not included in training data.

One of objects of the present invention is to provide an identification device capable of identifying a target in various forms, even when the number of samples of data in which the target is recorded is small.

Solution to Problem

An identification device according to one aspect of the present invention includes: an acquisition means for acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form; a conversion means for generating a second feature value by performing conversion using the conversion parameter with respect to the first feature value; a classification means for individually performing classification with respect to each of a plurality of third feature values including the second feature value, and generating a plurality of individual classification results indicating a result of the classification; a result derivation means for deriving, based on the plurality of individual classification results, identification result information being information relating to at least one of a classification destination and a form of the target to be identified; and an output means for outputting the identification result information.

An identification method according to one aspect of the present invention includes: acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form; generating a second feature value by performing conversion using the conversion parameter with respect to the first feature value; individually performing classification with respect to each of a plurality of third feature values including the second feature value, and generating a plurality of individual classification results indicating a result of the classification; deriving, based on the plurality of individual classification results, identification result information being information relating to at least one of a classification destination and a form of the target to be identified; and outputting the identification result information.

A storage medium according to one aspect of the present invention stores a program causing a computer to execute: acquisition processing of acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form; conversion processing of generating a second feature value by performing conversion using the conversion parameter with respect to the first feature value; classification processing of individually performing classification with respect to each of a plurality of third feature values including the second feature value, and generating a plurality of individual classification results indicating a result of the classification; result derivation processing of deriving, based on the plurality of individual classification results, identification result information being information relating to at least one of a classification destination and a form of the target to be identified; and output processing of outputting the identification result information. The storage medium is, for example, a computer-readable non-transitory storage medium.

Advantageous Effects of Invention

The present invention enables identifying a target in various forms, even when the number of samples of data in which the target is recorded is small.

BRIEF DESCRIPTION OF DRAWINGS

FIG. 3 is a diagram illustrating an example of a matrix used in variable conversion.

EXAMPLE EMBODIMENT

In the following, example embodiments according to the present invention are described in detail with reference to the drawings.

First Example Embodiment

Figure 2:
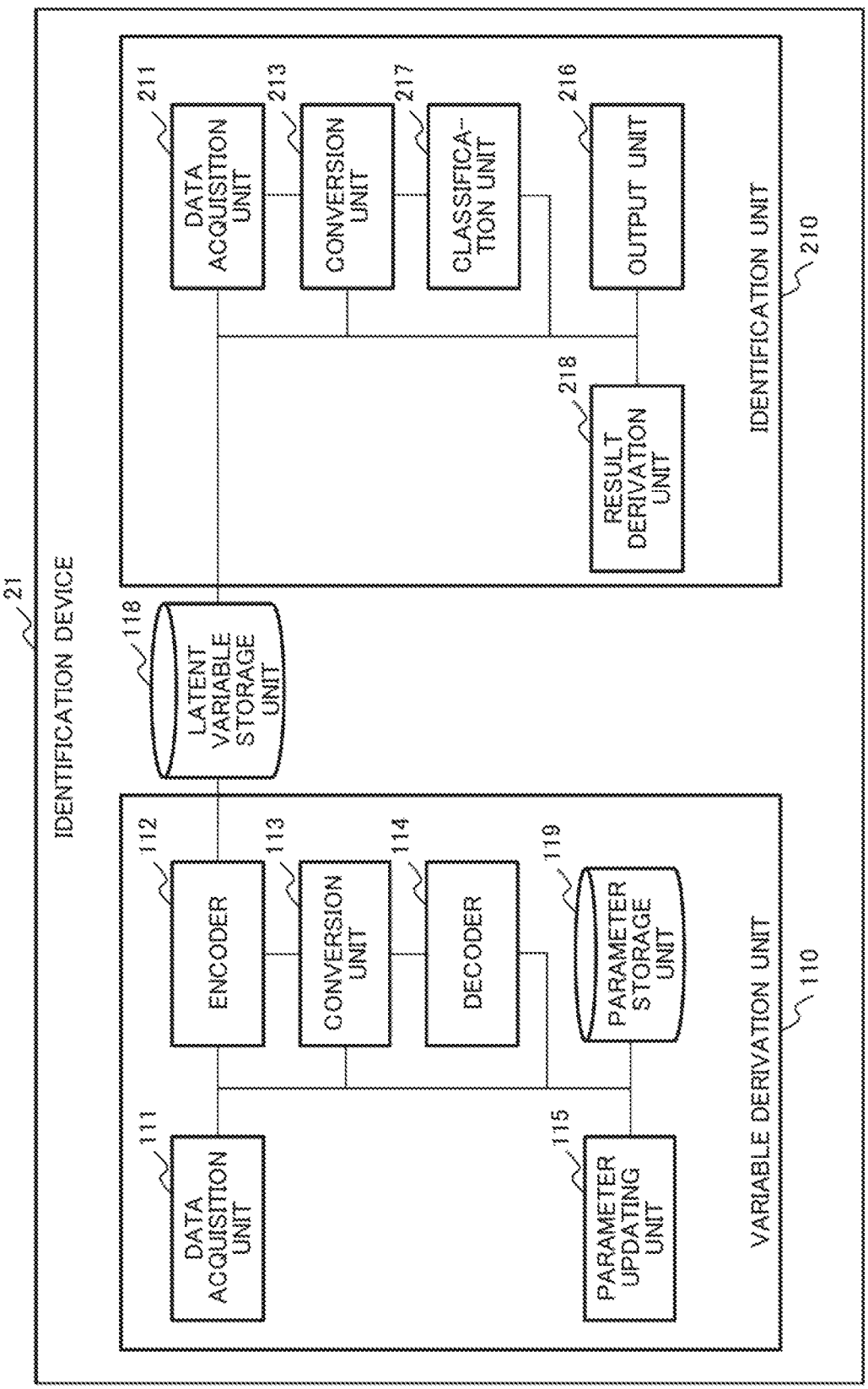
FIG. 2 is a block diagram illustrating a configuration of an identification device according to a first example embodiment of the present invention.

First, a first example embodiment according to the present invention is described. FIG. 2 is a block diagram illustrating a configuration of an identification device 21 according to the first example embodiment.

The identification device 21 performs three processing, namely, learning processing of variable derivation, variable derivation processing, and identification processing. In the present disclosure, a unit relating to the learning processing of variable derivation and the variable derivation processing is referred to as a variable derivation unit 110, and a unit relating to the identification processing is referred to as an identification unit 210.

In the following, first, a configuration and an operation of the variable derivation unit 110 are described.

[Variable Derivation Unit 110]
<Configuration>

The variable derivation unit 110 includes a data acquisition unit 111, an encoder 112, a conversion unit 113, a decoder 114, a parameter updating unit 115, and a parameter storage unit 119.

The data acquisition unit 111, the encoder 112, the conversion unit 113, the decoder 114, and the parameter updating unit 115 are achieved by, for example, one or a plurality of central processing units (CPUs) for executing a program.

The parameter storage unit 119 is, for example, a memory. The parameter storage unit 119 may be an auxiliary storage device such as a hard disk. In another example embodiment, the parameter storage unit 119 may be provided on the outside of the identification device 21, and may be configured to be communicable with the identification device 21 wiredly or wirelessly. The parameter storage unit 119 stores a parameter for use in conversion to be performed by the encoder 112, and a parameter for use in conversion to be performed by the decoder 114.

The variable derivation unit 110 may include a storage device for transitorily or non-transitorily storing data, independently of the parameter storage unit 119.

===Data Acquisition Unit 111===

The data acquisition unit 111 acquires data to be used by the variable derivation unit 110. The data to be used by the variable derivation unit 110 are input data, correct answer data, and difference information indicating a relation between the input data and the correct answer data.

The input data are data in which a learning target by the variable derivation unit 110 is recorded. To facilitate understanding, in description of the present example embodiment, an optical image is assumed as one example of the input data. Examples of the input data other than the optical image are described in the section "Supplement".

When the input data are an optical image, the input data are an image in which a target (e.g., an object, a person, and the like) is displayed. The input data are, for example, a vector in which pixel values of pixels of an image are components. When a gray scale image of 28 pixels in a vertical direction and 28 pixels in a horizontal direction is set as the input data, the number of components of the input data is 28×28=784.

The size of the image may be any size. The pixel value may an integer value from 0 to 255, a binary value of 0 or 1, or a floating point number. The number of types of colors may be one, or two or more. When the number of types of colors is plural, the number of components of the input data increases in proportion to the number of the types. As examples of the input data, an RGB image, a multi-spectral image, a hyper-spectral image, and the like are exemplified.

The data acquisition unit 111 acquires the input data by receiving from a storage device present inside or outside the identification device 21, for example. The identification device 21 may include a device capable of acquiring the input data, such as a camera, and the data acquisition unit 111 may receive the input data from the device.

The correct answer data are data for use in learning variable derivation, specifically, in updating a parameter value by the parameter updating unit 115 to be described later.

The correct answer data are data in which a target indicated by the input data is recorded. At least one piece of the correct answer data are data in which a target indicated by the input data is recorded in a form different from a form in the input data. When the input data and the correct answer data are an image, the form may be paraphrased as "a way of display" or "a way of appearance". As examples of the form in an image, a direction, an angle, a posture, a size, a way of distortion, a hue, a sharpness, and the like are exemplified. The form that can be different between the input data and the correct answer data is defined in advance. In other words, the variable derivation unit 110 handles a set of input data and correct answer data in which at least one specific form is different. The identification device 21 may handle the input data, as one piece of the correct answer data.

The data acquisition unit 111 acquires the correct answer data by receiving from a storage device present inside or outside the identification device 21, for example. The identification device 21 may include a device capable of acquiring the correct answer data, such as a camera, and the data acquisition unit 111 may receive the correct answer data from the device.

Alternatively, the data acquisition unit 111 may generate correct answer data by processing input data. For example, by employing processing in which a rotational angle of a target is changed, or a known technique for changing a hue or a sharpness, the data acquisition unit 111 is able to generate correct answer data by processing input data.

The difference information is information indicating a relation between input data and correct answer data. Specifically, the difference information indicates a difference between a form of a target indicated by input data, and a form of the target indicated by correct answer data. The difference information may be represented by a parameter, which indicates whether there is a difference, or how much the difference is, for example.

Figure 1A:
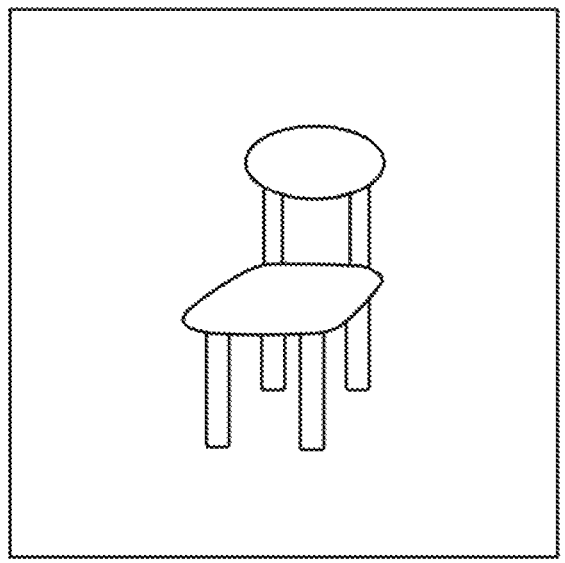
FIG. 1A is a diagram illustrating an example of data in which a target is recorded.
Figure 1B:
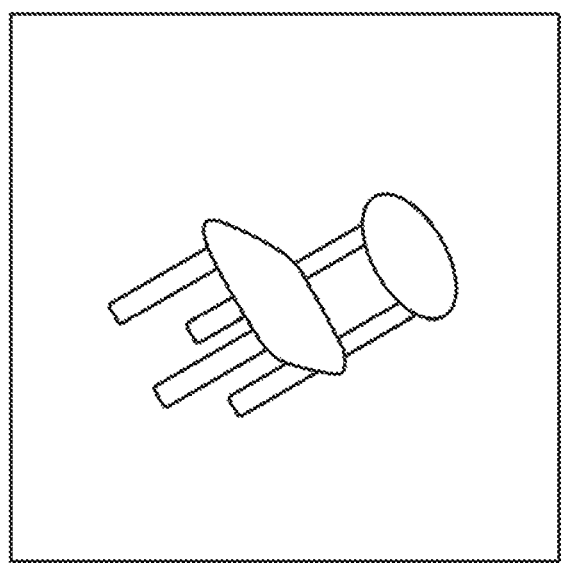
FIG. 1B is a diagram illustrating an example of data in which the target in another form is recorded.
Figure 1C:
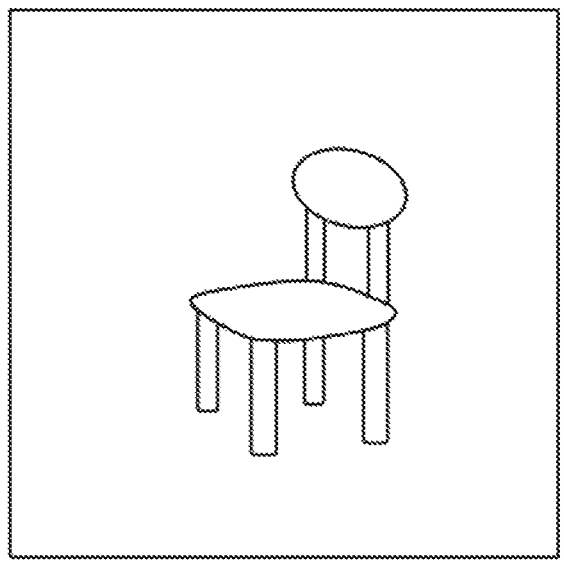
FIG. 1C is a diagram illustrating another example of data in which the target in another form is recorded.

As a simple example, it is assumed that input data are an image in which a chair is displayed, and correct answer data are an image in which the chair is captured in a direction different from that in the input data. An example of a set of the input data and the correct answer data are a set of the image in FIG. 1A and the image in FIG. 1B, a set of the image in FIG. 1A and the image in FIG. 1C, or the like. An example of difference information indicating a relation between the image in FIG. 1A and the image in FIG. 1B is a value indicating an angle of rotation ("+60 (degrees)" and the like). An example of difference information indicating a relation between the image in FIG. 1A and the image in FIG. 1C is a value indicating a change in azimuth ("−20 (degrees)" and the like).

When the input data are an optical image, an example of a difference indicated by the difference information include, for example, as a comparison with respect to the input data, an angle of rotation with respect to a direction perpendicular to a display plane of an image as an axis, a difference in angle (direction of a target with respect to a device for capturing the target), a degree of increase (or a degree of decrease) in brightness, a difference in contrast, a difference in density of noise (presence of rain, fogs, and the like, or noise resulting from low resolution), presence or absence of an obstacle, an accessory, or decoration, and the like. When the target is an object fluttering in the wind, such as hairs and a flag, information indicating the strength of wind may be the difference information. A parameter having a strong relation with the above-described examples may be employed as the difference information. When input data and correct answer data are individually acquired, a target form indicated by difference information to be employed does not have to be a form capable of representing a change by processing the input data.

The difference information may be a quantitative parameter, or may be a parameter having a plurality of steps. As one example, when the difference information is a parameter indicating strength of rain, the difference information may be represented by four types of values, namely, "not raining", "weak", "relatively hard", and "hard". The difference information may be a parameter having a binary value (e.g. "yes" and "no").

The data acquisition unit 111 acquires difference information by receiving from a storage device present inside or outside the identification device 21, for example. The data acquisition unit 111 may receive, from a person or a device, which grasps a relation between input data and correct answer data, an input of difference information; and acquire the input difference information. The data acquisition unit 111 may acquire the difference information by specifying a difference by comparison of input data with correct answer data.

===Encoder 112===

The encoder 112 derives, from input data, a set of values of latent variables. The encoder 112 inputs, to an input layer of a neural network, input data by using the neural network, and derives n values as an output, for example. The number n is a unit number of an output layer of a neural network. In the present disclosure, a set of the n values is referred to as a set of values of latent variables, or a latent variable vector. In the present example embodiment, although a term "vector" is used, the latent variable vector is not limited to a one-dimensional sequence of a plurality of values. The number of values to be output may be one. Alternatively, the latent variable vector may be two or more dimensional sequences. The latent variable vector may be held in the identification device 21 in a format other than the sequence format. Deriving a latent variable vector by a neural network is also referred to as encoding (encode).

A neural network structure to be used by the encoder 112 can be freely designed. For example, there is no limitation on the number of layers, the number of components of each layer, and a way of connection between components. As one example, the encoder 112 may use a convolutional neural network constituted of an input layer in which the number of components is 784, an intermediate layer in which the number of components is 512, and an output layer in which the number of components is 144. The number of values to be output by the encoder 112 (specifically, the number of components of a latent variable vector) is typically configured to be smaller than the number of components in input data. However, the number of values to be output by the encoder 112 may be configured to be equal or larger than the number of components in input data.

An activation function to be used in a neural network to be employed in the encoder 112 may be any activation function. As examples of the activation function, an identity function, a Sigmoid function, a rectified linear unit (ReLU) function, a hyperbolic tangential function, and the like are exemplified.

The encoder 112 reads, from the parameter storage unit 119, a parameter (typically, a weight and a bias) in a neural network to be used, and performs encoding of input data.

===Conversion Unit 113===

The conversion unit 113 converts a latent variable vector output by the encoder 112 into another latent variable vector. Converting a latent variable vector by the conversion unit 113 is referred to as variable conversion in the present disclosure.

The conversion unit 113 converts a latent variable vector by using a conversion function. The conversion unit 113 uses a different conversion function according to the above-described difference information.

For example, the conversion unit 113 uses a conversion function using a conversion parameter having a value that can be different according to difference information. The conversion unit 113 may determine a conversion parameter according to difference information, and thereafter, convert a latent variable vector by using a conversion function using the determined conversion parameter.

As an example of the conversion function, a function for changing a layout of components of a latent variable vector is exemplified. For example, the conversion function is a function for shifting a layout of components of a latent variable vector. A shift value may be determined by a conversion parameter. An operation of shifting a layout of components of a vector in which the number of components is n by k is an operation of moving the first to the (n−k)-th components in the vector to the (k+1)-th to the n-th components, and moving the (n−k)-th to the n-th components to the first to the k-th components.

As a specific example, it is assumed that the conversion function is a function for shifting a layout of components of a latent variable vector in which the number of components is 144, based on a value of a conversion parameter p. It is assumed that difference information to be acquired by the data acquisition unit 111 is a rotational angle θ, and θ is a multiple of 5 among integers of not smaller than 0 but smaller than 360. In such a case, a value acquired by dividing θ by 5 may be defined as the conversion parameter p. Then, p is a parameter capable of having an integer value in the range from 0 to 71. The conversion function may be defined in such a way that a value twice the value of p is equal to a value by which a layout of components of the latent variable vector is shifted.

For example, the value of the conversion parameter p equivalent to rotation by 40 degrees is 8, which is equivalent to shifting a layout of components of a latent variable vector by 16.

A conversion function for shifting a layout of components of a latent variable vector can be expressed as multiplication of a conversion matrix representing a shift, for example. When it is assumed that a latent variable vector is $Z_0$, the number of components of the latent variable vector is n, a value of a conversion parameter is k, and a conversion matrix representing a shift is $S_k$, $S_k$ is a matrix of n×n, and the conversion function is expressed by the following formula.

$$F(k, Z_0) = S_k \cdot Z_0$$

The matrix $S_k$ is a matrix illustrated in FIG. 3. Specifically, the matrix $S_k$ is a matrix in which, regarding i where $1 \leq i \leq (n-kr)$, a numerical value of the i-th row and the (kr+i)-th column is 1, regarding j where $1 \leq j \leq kr$, the (n−kr+j)-th row and the j-th column is 1, and numerical values other than the above are 0. However, when it is assumed that the possible number of values of k is N(k), kr is a value to be acquired by k×n/N(k).

By performing conversion by the conversion unit 113, a new latent variable vector in which the number of components is n is generated.

A method for generating a function or a matrix for variable conversion is not limited to the above. For example, the conversion unit 113 may use a matrix to be generated by applying a Gaussian filter to a matrix $S_k$, in place of the above-described matrix $S_k$.

The type of variable conversion is not limited to a shifting operation described above. For example, the variable conversion may be subtraction processing of a component value in which a subtraction value increases according to a magnitude of difference indicated by difference information. The variable conversion may be smoothing processing, which is performed a number of times according to a magnitude of difference indicated by difference information. The variable conversion may be calculation with respect to a predetermined component, and a content of calculation or the number of components subjected to calculation may depend on a magnitude of difference indicated by difference information.

Variable conversion to be performed by the conversion unit 113 may include identity conversion. In particular, variable conversion when difference information indicates no difference may be identity conversion.

When there are two or more types of forms which can be different between input data and output data, the conversion unit 113 may respectively perform variable conversion, based on difference information relating to each of the forms. As one example, when difference information is represented by two parameters (α,β) indicating a change in three-dimensional directions, the conversion unit 113 may generate a new latent variable vector by applying, to a latent variable vector, a conversion function depending on α, thereafter applying a conversion function dependent on β. Further, a conversion function depending on α, and a conversion function depending on β may be applied in parallel. Alternatively, the conversion unit 113 may determine one conversion function, based on each piece of difference information indicating a difference in two or more types of forms, and perform variable conversion by using the conversion function.

===Decoder 114===

The decoder 114 generates output data from a converted latent variable vector by the conversion unit 113. The decoder 114 inputs, to an input layer of a neural network, a latent variable vector by using a neural network (different from a neural network to be used by the encoder 112), and generates output data constituted of m components as an output, for example. The number m is a unit number of an output layer of a neural network to be used by the decoder 114. The number m is set to a same value as the number of components of correct answer data. When input data and correct answer data are data represented in a same format, the number m coincides with the number of components of the input data, specifically, a unit number of an input layer of the encoder 112. Generating output data from a latent variable vector by a neural network is also referred to as decoding (decode).

A neural network structure to be used by the decoder 114 can be freely designed. For example, there is no limitation on the number of layers, the number of components of an intermediate layer (in the case of a multi-layer neural network), and a way of connection between components. As one example, the decoder 114 may use a neural network constituted of an input layer in which the number of components is 144, an intermediate layer in which the number of components is 512, and an output layer in which the number of components is 784.

An activation function to be used in a neural network to be employed in the decoder 114 may be any activation function. As examples of the activation function, an identity function, a Sigmoid function, an ReLU function, a hyperbolic tangential function, and the like are exemplified.

The decoder 114 reads, from the parameter storage unit 119, a value of a parameter (typically, a weight and a bias) in a neural network to be used, and performs decoding of a latent variable vector.

===Parameter Updating Unit 115===

The parameter updating unit 115 updates a parameter value of a neural network to be used by the encoder 112 and the decoder 114, based on comparison of output data generated by the decoder 114 with correct answer data acquired by the data acquisition unit 111.

A specific example of a procedure of updating a parameter value is described. First, the parameter updating unit 115 calculates an error of output data with respect to correct answer data, regarding one or more sets of correct answer data and output data. The parameter updating unit 115 may use, as an error function for acquiring an error, a mean square error, for example. The parameter updating unit 115 determines a new parameter value in such a way that a calculated error decreases. As a method for determining a new parameter value, a method being known as a method for optimizing a parameter value, which is employed in a general autoencoder, may be employed. As one example, the parameter updating unit 115 may calculate a gradient by using an error reverse propagation method, and determine a parameter value by using stochastic gradient decent (SGD). As other employable methods, "RMSprop", "Adagrad", "Adadelta", "Adam", and the like are exemplified.

The parameter updating unit 115 records, in the parameter storage unit 119, the determined new parameter value. Hereinafter, the encoder 112 and the decoder 114 use the new parameter value. The foregoing is a specific procedure of updating.

A parameter value to be updated by the parameter updating unit 115 is a weight and a bias of a neural network to be used by the encoder 112, and a weight and a bias of a neural network to be used by the decoder 114. A conversion parameter to be used in variable conversion is not included in a target parameter to be updated by the parameter updating unit 115.

The parameter updating unit 115 may repeat updating a parameter value a predetermined number of times. The predetermined number of times may be determined to a value by which an input of a numerical value indicating the predetermined number of times is received from a user of the identification device 21 via an input interface.

An error function for use in acquiring an error by the parameter updating unit 115 can be freely designed. The parameter updating unit 115 may use an error function, taking into consideration a value of an average and a variance of a latent variable vector, like an error function to be used by a variational autoencoder (VAE).

<Overview of Processing relating to Learning on Variable Derivation>

Figure 4:
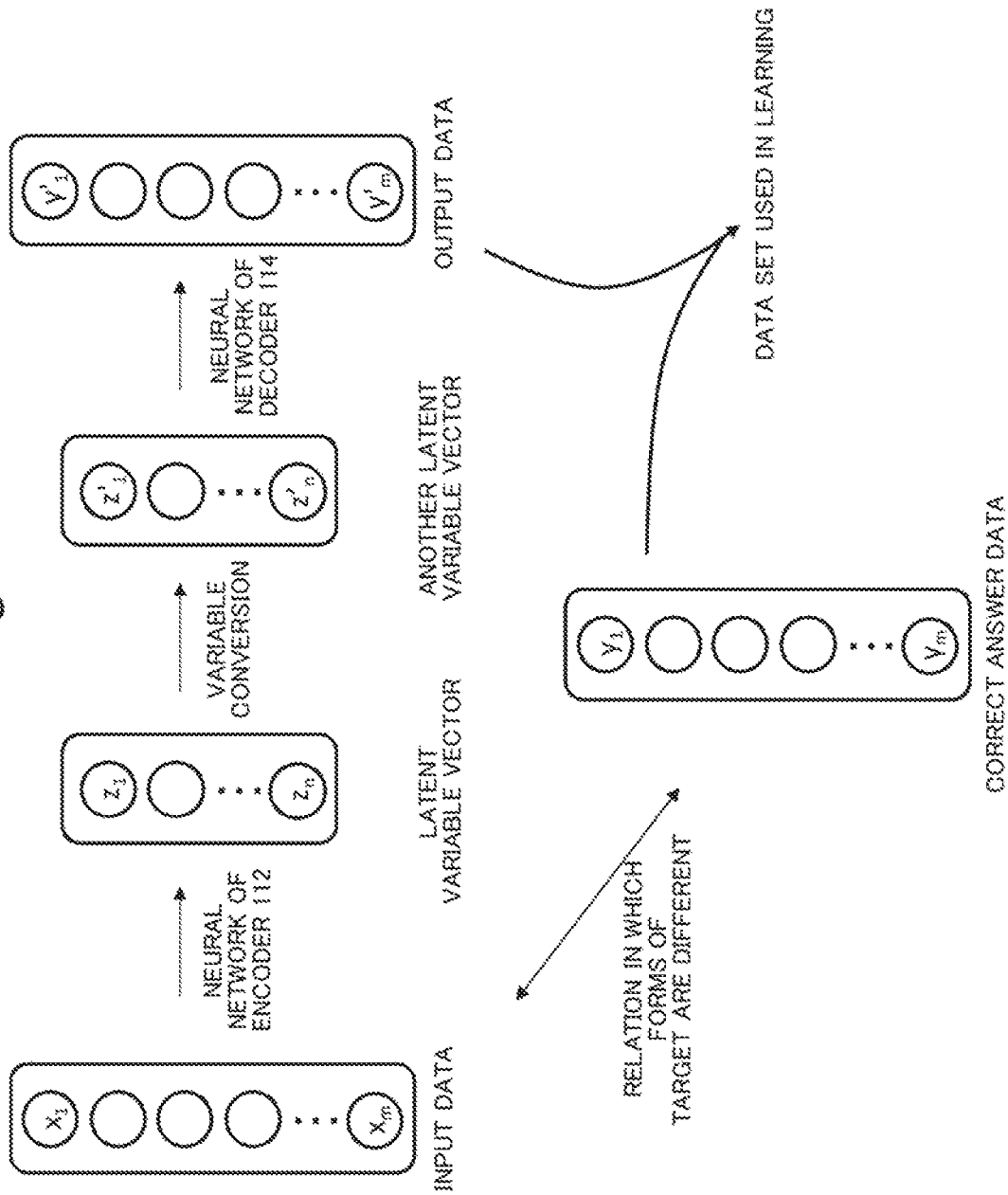
FIG. 4 is a conceptual diagram for describing learning on variable derivation according to the first example embodiment.

An overview of processing relating to learning on variable derivation by the variable derivation unit 110 is described with reference to FIG. 4.

First, by a neutral network of the encoder 112, a latent variable vector having n components (z1, z2, . . . , and zn) is derived from input data having m data values (x1, x2, . . . , and xm) as components. This latent variable vector is converted into another latent variable vector having n components (z'1, z'2, . . . , and z'n) by variable conversion by the conversion unit 113. Output data having m components (y'1, y'2, . . . , and y'm) are generated from the another latent variable vector by a neural network of the decoder 114.

A set of output data generated as described above, and correct answer data having m components (y1, y2, . . . , and ym) and being in a relation such that a form of a target is different with respect to input data is used in learning, as a training data set.

<Flow of Processing relating to Learning on Variable Derivation>

Figure 5:
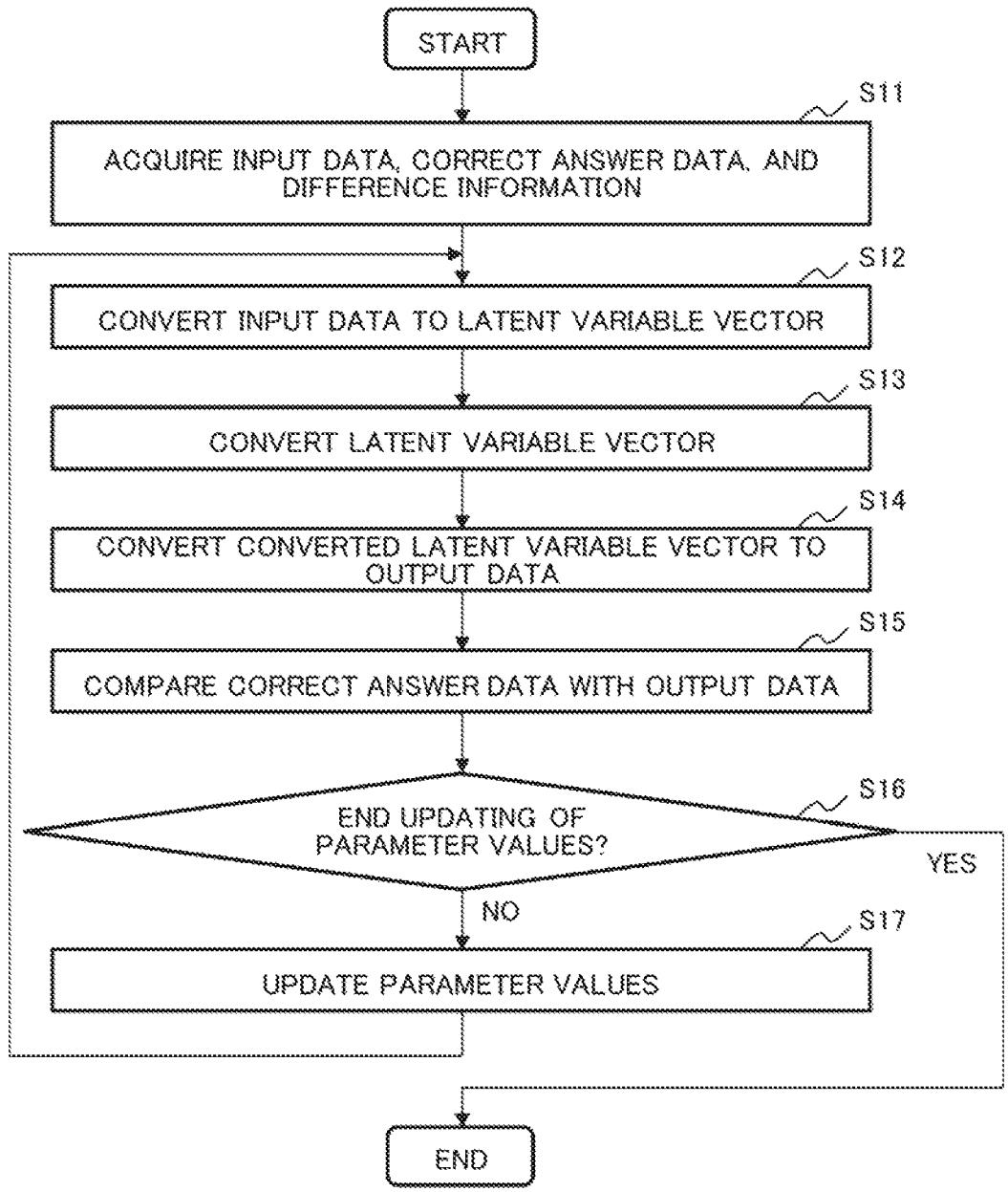
FIG. 5 is a flowchart illustrating a flow of processing relating to learning on variable derivation.

A flow of processing relating to learning on variable derivation by the variable derivation unit 110 is described with reference to a flowchart of FIG. 5. When each processing included in processing relating to learning on variable derivation is performed by a device for executing a program, each processing may be performed according to an order of command in the program. When each processing is performed by an individual device, next processing may be performed by causing a device that has completed processing to notify a device that performs the next processing. Each unit for performing processing records, in a storage area included in the identification device 21 or in an external storage device, data generated by individual processing, for example. Each unit for performing processing may receive data necessary for individual processing, from a unit that has generated the data, or read the data from the above-described storage area included in the identification device 21 or from the external storage device.

First, the data acquisition unit 111 acquires input data, correct answer data, and difference information (Step S11). However, a timing at which various types of data are acquired may not be the same. A timing at which data are acquired may be any timing before processing of a step in which the data are used is performed.

Subsequently, the encoder 112 converts the input data into a latent variable vector (Step S12).

Subsequently, the conversion unit 113 converts the latent variable vector by using a conversion parameter value according to a difference indicated by the difference information (Step S13).

Subsequently, the decoder 114 converts the converted latent variable vector into output data (Step S14).

Subsequently, the parameter updating unit 115 determines whether updating a parameter value used in the encoder 112 and the decoder 114 is finished.

A case that updating is finished is a case that the number of times the parameter updating unit 115 updates a parameter value reaches a predetermined number of times.

As another example, a case that updating is finished may be a case that an error of output data with respect to correct answer data is sufficiently small. For example, in the following case, the parameter updating unit 115 may determine that an error is sufficiently small, and determine that updating is finished.

A case that a value indicating an error lowers below a predetermined reference value, a case that it is not possible to decrease an error any more, or a case that a decrease value of error (specifically, a difference between an error immediately before updating is performed last time, and an error after updating), or a decrease rate (specifically, a ratio of a decrease value with respect to a current error) lowers below a predetermined reference value.

Alternatively, the parameter updating unit 115 may determine that updating is finished, when an average value or a maximum value of an absolute change amount of each parameter value (specifically, an absolute value of a change amount of a parameter value when updating is performed), or an average value or a maximum value of a change rate (specifically, a ratio of an absolute change amount with respect to a current value) lowers below a predetermined reference value.

When updating is not finished (NO in Step S16), the parameter updating unit 115 updates the parameter value (Step S17), and the variable derivation unit 110 performs processing from Step S12 to Step S14 again. In processing of Step S12 and Step S14 in the second time operation and thereafter, the encoder 112 and the decoder 114 perform processing by using the updated parameter value. The parameter updating unit 115 compares output data newly generated by processing of Step S14 with correct answer data again (Step S15), and determines whether updating the parameter value is finished. In this way, the variable derivation unit 110 repeats updating a parameter value, and generating output data using the updated parameter value until updating the parameter is determined to be finished. Processing of updating a parameter value through such repetition is learning on variable derivation. The parameter updating unit 115 updates a parameter value by learning in which a set of output data and correct answer data is used as a so-called training data set. Setting a parameter value to a more optimum value by repeating updating is also referred to as optimization.

When updating the parameter value is determined to be finished (YES in Step S16), processing of learning on variable derivation is finished.

<Advantageous Effects by Learning on Variable Derivation>

The variable derivation unit 110 is able to derive, regarding a same target, latent variable vectors respectively representing features of the target in different forms and having relations to one another.

An example of advantageous effects provided by the variable derivation unit 110 is as follows, based on the above-described specific example.

The encoder 112, the conversion unit 113, and the decoder 114 of the conversion derivation unit 110 after learning has completed are able to generate a plurality of images indicating a target in different forms according to a conversion parameter. Therefore, a latent variable vector to be output by the encoder 112 can represent a change thereof by conversion, even when a form of a target within an image is changed. In other words, combination of the encoder 112 and the conversion unit 113 enables to generate latent variable vectors respectively representing features of a target in different forms and having relations to one another.

When a difference in form is a difference that can be quantitatively represented, a pair of the conversion unit 113 and the decoder 114 may be able to generate data in which a form that is not present in correct answer data is recorded. For example, it is assumed that, in learning on variable derivation, data in which a target in a certain form (referred to as a "form SA") is recorded, and data in which the target in another form (referred to as a "form SC") is recorded are respectively used as correct answer data. The conversion unit 113 is able to generate, from a latent variable vector representing a target in the form SA, a latent variable vector representing the target in a form (referred to as a "form SB") equivalent to a form between the form SA and the form SC, by variable conversion using one-half of a conversion parameter value equivalent to a change from the form SA to the form SC. Causing the decoder 114 to generate output data from this latent variable vector may be able to generate output data in which the target in the form SB is recorded.

Even when a difference in form is a difference that cannot be quantitatively represented, the pair of the conversion unit 113 and the decoder 114 may be able to generate data in which a form that is not present in correct answer data is recorded. For example, it is assumed that, in learning on variable derivation, data in which a certain target (referred to as a "target TA") in the form SA is recorded, data in which the target TA in the form SB is recorded, and data in which another target (referred to as a "target TB") in the form SA is recorded are respectively used as correct answer data. By this learning, the pair of the conversion unit 113 and the decoder 114 is able to generate, from a latent variable vector, data in which the target TA in the form SA is recorded, and data in which the target TA in the form SB is recorded. Therefore, it is conceived that the conversion unit 113 can derive a latent variable vector representing the target TB in the form SB by converting a latent variable vector representing the target TB in the form SA. It is expected that the converted latent variable vector is also able to generate data in which the target TB in the form SB is recorded by decoding.

When a difference in form is a difference that can be quantitatively represented, the encoder 112 may be able to derive a latent variable vector representing a target in a form that is not present in input data. For example, it is assumed that, in learning on variable derivation, data in which a target in the form SA is recorded, and data in which the target in the form SC is recorded are respectively used as input data. When data in which the target in the form SB equivalent to a form between the form SA and the form SC is recorded are input to the encoder 112 after optimization of the parameter value, a latent variable vector to be derived may be similar to (or coincide with) a latent variable vector generatable by performing variable conversion from a latent variable vector representing the target in the form SA. Specifically, the encoder 112 may be able to derive, from a target in a form that is not used in learning, a latent variable vector convertible into a latent variable vector representing a form different from the form.

Even when a difference in form is a form that cannot be quantitatively represented, the encoder 112 may be able to derive a latent variable vector representing a target in a form that is not present in input data. For example, it is assumed that, in learning on variable derivation, data in which the target TA in the form SA is recorded, data in which the target TA in the form SB is recorded, and data in which the target TB in the form SA is recorded are respectively used as input data. By this learning, the encoder 112 is able to derive a latent variable vector representing the target TA in the form SB. Therefore, it is conceived that the encoder 112 is also able to derive, from data in which the target TB in the form SB is recorded, a latent variable vector representing the target TB in the form SB. It is expected that it is also possible to convert from this latent variable vector to be derived into a latent variable vector representing the target TB in the form SA by variable conversion.

As described above, by learning on variable derivation, the encoder 112 may be able to derive, from a same target in different forms, latent variable vectors mutually convertible by conversion using a conversion parameter.

[Supplement]

As long as the identification device 21 is able to acquire two or more pieces of data in which forms of a target are different, and information (difference information) indicating a difference between these pieces of data, any data, any target, and any difference in form may be handled.

Input data are not limited to an optical image. Any input data may be available, as long as the input data are data in which a target whose form is changeable is recorded, and capable of being represented by a variable convertible by a neural network.

One example of the input data are SAR data. The SAR data are sensing data to be acquired by a synthetic aperture radar (SAR). Examples of a target to be recorded by SAR data are a terrain, a structure, a vehicle, an aircraft, and a ship. Examples of a changeable form are an azimuth and a depression angle when SAR data are acquired. In other words, a difference resulting from a sensing condition by an SAR may be employed as a difference to be handled by the identification device 21.

For example, the input data may be time-series data of sensing data to be acquired by a sensing device.

For example, the input data may be sound data. The sound data are data in which a sound is recorded. When the input data are sound data, the input data may be specifically represented by an amplitude for each time, a strength of a spectrogram for each time window, and the like.

When the input data are sound data, examples of the target are a human voice, an utterance content, an acoustic event, music, and the like. The acoustic event is a sound indicating occurrence of some event, such as a scream, a sound of crushed glass, and the like. When the input data are sound data, examples of a changeable form are a frequency (pitch of sound), a recording place, a degree of echo, a tone, a reproduction speed (tempo) of data, a degree of noise, a type of an object that generates a sound, a person who generates a sound, or an emotional state of the person, and the like.

<Variable Derivation Processing>

The variable derivation unit 110 performs variable derivation processing to be described in the following, after learning on variable derivation is performed.

First, the data acquisition unit 111 acquires new input data.

Then, the encoder 112 derives, from the new input data, a latent variable vector. At this occasion, the encoder 112 uses a parameter optimized by learning on variable derivation.

Then, the encoder 112 records, in a latent variable storage unit 118, the derived latent variable vector.

[Identification Unit 210]

A configuration and an operation of the identification unit 210 are described.

<Configuration>

Referring to FIG. 2, the identification unit 210 includes a data acquisition unit 211, a conversion unit 213, a classification unit 217, a result derivation unit 218, and an output unit 216.

Each of the units included in the identification unit 210 is achieved by one or a plurality of CPUs for executing a program, for example.

The identification device 21 may include a storage device for transitorily or non-transitorily storing data.

===Data Acquisition Unit 211===

The data acquisition unit 211 acquires data to be used by the identification unit 210. The data to be used by the identification unit 210 are a latent variable vector derived by the encoder 112.

The data acquisition unit 211 may acquire the latent variable vector derived by the encoder 112 by reading from the latent variable storage unit 118.

===Conversion Unit 213===

The conversion unit 213 converts a latent variable vector output by the encoder 112 into another latent variable vector. The conversion unit 213 performs variable conversion using a conversion function, similarly to the conversion unit 113. The conversion function to be used by the conversion unit 213 is a conversion function of the same type as that in the conversion unit 113, specifically, a conversion function in which only a conversion parameter value is different at most.

The conversion unit 213 may generate a plurality of another latent variable vectors by a plurality of variable conversions using various conversion parameter values.

For example, it is assumed that a conversion function is a function for shifting a layout of components of a latent variable vector by 2p, and a conversion parameter p is a parameter capable of having an integer value in the range from 0 to 71. In such a case, the conversion unit 213 may perform seventy-one variable conversions in total where $p=1, 2, \ldots$, and 71, and generate seventy-one latent variable vectors. The conversion unit 213 may also perform variable conversion (identify conversion) where $p=0$.

As another example, it is assumed that a conversion function is a conversion function such that a conversion parameter is a parameter that qualitatively represents a stepwise change in form. In such a case, the conversion unit 213 generates another latent variable vector by variable conversion for converting from a certain step into another step. For example, when the number of steps is 4, the number of variable conversions is maximally 12 except for identity conversion (since there are conversions into another three steps from each of four steps).

As long as there is a quantitative relation between a stepwise change in form and a conversion parameter value, the number of variable conversions can be reduced. For example, it is assumed that there are nine steps from the first step to the ninth step, and a change from the m-th step (where m is an integer from 1 to 9) to the n-th step (where n is an integer from 1 to 9) is equivalent to conversion by a conversion function, when the value of the conversion parameter p is n−m. In such a case, for example, conversion equivalent to a change from the first step to the second step is equivalent to conversion equivalent to a change from the second step to the third step. Therefore, in such a case, there are 9×8=72 types of stepwise changes. However, the number of variable conversions except for identity conversion is 16 at most, since the number is equal to the number of conversions by a conversion function, when the value of p is set to one of integer values from "−8" to "+8" except for 0.

The conversion unit 213 may perform all executable variable conversions, or may perform a part thereof.

When there are two or more types of changeable forms, the conversion unit 213 is only required to perform variable conversion relating to each of the forms. In this case, when the number of first variable conversions is W1, and the number of second variable conversions is W2, the number of another latent variable vectors generatable by the conversion unit 213 by the first and second variable conversions is maximally W1×W2. Alternatively, when two or more types of forms are represented by one parameter, the conversion unit 213 may convert a latent variable vector by variable conversion using one conversion function that is determined by a possible value of the parameter.

===Classification Unit 217===

The classification unit 217 individually performs classification with respect to a plurality of latent variable vectors to be output by the conversion unit 213. For example, the classification unit 217 inputs a latent variable vector to an input layer of a neural network by using the neural network (different from a neural network to be used by the encoder 112), and generates information indicating an individual classification result as an output.

The information indicating an individual classification result is a multi-dimensional vector indicating a distribution of a probability (which may also be referred to as a likelihood) with which a target belongs to a class being a classification destination, when the classification unit 217 is used as a multi-class classifier. The number of components of the multi-dimensional vector in such a case is the number of classes being a classification destination. When the classification unit 217 is used as a binary classifier, the information indicating an individual classification result may be a numerical value indicating a probability with which a target is a predetermined recognition target.

A neural network structure to be used by the classification unit 217 can be freely designed. For example, there is no limitation on the number of layers, the number of components of an intermediate layer (in the case of a multi-layer neural network), and a way of connection between components. An activation function to be used in a neural network to be employed in the classification unit 217 may be any activation function.

The classification unit 217 individually performs classification with respect to at least two latent variable vectors, and generates at least two individual classification results.

One of the above-described at least two latent variable vectors may be a latent variable vector acquired by the data acquisition unit 211.

The classification unit 217 is already configured to be able to correctly classify a target in a predetermined form.

===Result Derivation Unit 218===

The result derivation unit 218 derives information indicating an identification result, based on an individual classification result generated by the classification unit 217.

The information indicating an identification result is information indicating to which class, the target is classified (specifically, as what the target is identified).

The result derivation unit 218 may determine a classification destination of the target, based on the individual classification result, and output, as the information indicating an identification result, information indicating the determined classification destination.

In the following, a specific example of a method for determining a classification destination, based on an individual classification result is described.

As one example, it is assumed that W L-dimensional vectors are generated as an individual classification result by the classification unit 217.

The result derivation unit 218 may specify an individual classification result having a highest reliability among these L-dimensional vectors, and determine, as a classification destination, a class indicated by the specified individual classification result. The result derivation unit 218 may specify, as the individual classification result having a highest reliability, an L-dimensional vector having a component whose value (likelihood) is highest among the W L-dimensional vectors. The result derivation unit 218 may determine, as a classification destination, a class associated with a component whose value is highest in the specified L-dimensional vector.

The result derivation unit 218 may specify a class associated with a component having a highest value in each of the W L-dimensional vectors, and determine, as a classification destination, a class having a largest number among the specified W classes.

The result derivation unit 218 may calculate an average vector being an average of the W L-dimensional vectors, and determine a classification destination, based on the average vector. For example, the result derivation unit 218 may determine, as a classification destination, a class associated with a component having a highest value among components of the average vector.

The information indicating an identification result may be information indicating a high possibility with which the target may belong to a class. For example, the result derivation unit 218 may output, the above-described average vector, as the information indicating an identification result.

When classification by the classification unit 217 is binary classification, the information indicating an identification result is, for example, information indicating whether the target is recognized. The information indicating an identification result may be a value indicating a probability with which the target is recorded.

The result derivation unit 218 may include information relating to a form of the target in the information indicating an identification result, and output, in addition to information indicating a classification destination.

The information relating to a form of the target is information directly or indirectly indicating the form of the target.

For example, when a latent variable vector generated by certain variable conversion gives an individual classification result having a highest reliability, this means that data when a change equivalent to the certain variable conversion occurs in a form of the target in input data is most approximate to data that can be most correctly classified by the classification unit 217. Therefore, it is possible to specify to what degree, the form of the target in the input data is changed, as compared with the form (hereinafter, a "reference form") of the target in the data that can be most correctly classified by the classification unit 217.

For example, when the classification unit 217 is generated by learning using only SAR data acquired in a condition that the depression angle is 30°, the reference form is a form that "the depression angle is 30°". It is assumed that a latent variable vector generated by variable conversion in which the conversion parameter is "1" gives an individual classification result having a highest reliability. When an increase of the conversion parameter value by "1" is associated with a change such that the depression angle increases by 5°, it can be said that a possibility that input data are acquired in the condition that the depression angle is 25° is high. Therefore, the result derivation unit 218 may derive, as one piece of the information indicating an identification result, information indicating that "input data are data acquired in the condition that the depression angle is 25°".

In other words, the result derivation unit 218 may derive information indicating a difference between a form of the target in input data, and the reference form, based on the reference form, and a conversion parameter used in generating a latent variable vector that gives an individual classification result having a highest reliability.

As an example of the information indicating a difference between a form of the target in input data, and the reference form, the following information is exemplified in addition to the above.

"20°" (indicating that the target in the input data is in a form such that the target is rotated by 20° from a reference angle)

"It is raining hard"

"Crouching" (indicating that the target is crouching, specifically, the target is bending his/her body to some extent from a standing state).

"30 years old" (indicating the age of the target, which is estimated based on a difference with respect to a reference age)

"Key: +1" (indicating that the key is high by half pitch, as compared with the key of the original melody having a reference key)

The reference form is a form most frequently adopted by the target recorded in training data used in learning for generating the classification unit 217. When only a latent variable vector indicating the target in a predetermined form is used in learning of the classification unit 217, the predetermined form becomes the reference form.

===Output Unit 216===

The output unit 216 outputs information indicating a result of classification, which is derived by the result derivation unit 218. Examples of an output destination of an output by the output unit 218 include a display device, a storage device, and a communication network. When the output unit 216 outputs information to a display device, the output unit 216 may convert information in such a way that the display device can display the information. The above-described display device and storage device may be an external device of the identification device 21, or may be a constituent element included in the identification device 21.

<Specific Example of Identification Processing>

Figure 6:
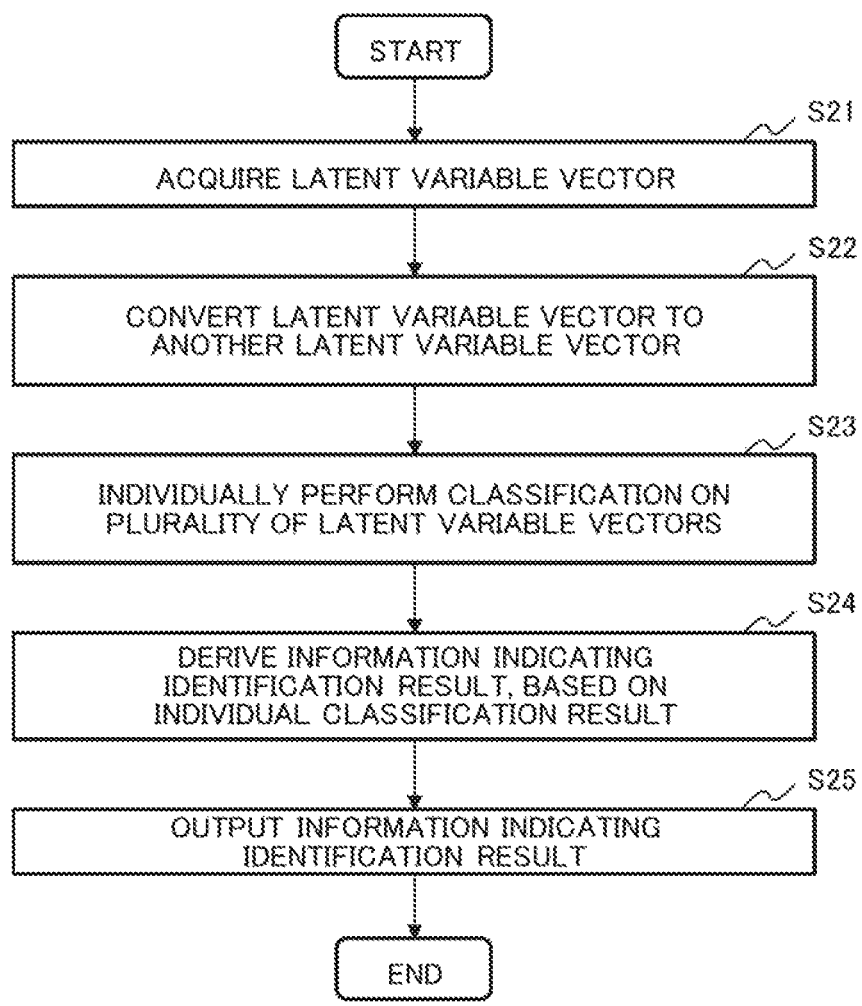
FIG. 6 is a flowchart illustrating a flow of processing relating to identification processing.

A flow of identification processing is described. FIG. 6 is a flowchart illustrating a flow of identification processing. When each processing included in identification processing is performed by a device for executing a program, each processing may be performed according to an order of command in the program. When each processing is performed by an individual device, next processing may be performed by causing a device that has completed processing to notify a device that performs the next processing. Each unit for performing processing records, in a storage area included in the identification device 21 or in an external storage device, data generated by individual processing, for example. Each unit for performing processing may receive data necessary for individual processing, from a unit that has generated the data, or read the data from the above-described storage area included in the identification device 21 or from an external storage device.

First, the data acquisition unit 211 acquires a latent variable vector derived by the encoder 112 (Step S21).

Subsequently, the conversion unit 213 converts the latent variable vector into another latent variable vector (Step S22).

Subsequently, the classification unit 217 individually performs classification with respect to a plurality of latent variable vectors (Step S23).

Subsequently, the result derivation unit 218 derives information indicating an identification result, based on an individual classification result (Step S24).

Then, the output unit 216 outputs the information indicating the identification result (Step S25).

<Advantageous Effects>

The identification device 21 is able to identify a target in various forms. A reason for this is that the classification unit 217 individually performs classification with respect to each of a plurality of latent variable vectors representing a plurality of forms of the target, and the result derivation unit 218 derives an identification result, based on a result of the classification. In particular, as long as the result derivation unit 218 derives an identification result, based on an individual classification result having a highest reliability, it is possible to derive a correct identification result, even when the classification unit 217 is a classifier for correctly classifying only a target in a predetermined form.

As long as the conversion unit 213 generates latent variable vectors as much as possible, identification accuracy can be enhanced, since a latent variable vector that gives an individual classification result having an enhanced reliability can be generated.

The conversion unit 213 can generate a plurality of latent variable vectors representing various forms, because the encoder 112 derives latent variable vectors that are related to one another by a parameter with respect to a same target in different forms.

As described above, in learning for generating the encoder 112, it is not necessarily required to prepare data in which a target to be identified is captured in all possible forms. In other words, the identification device 21 can identify a target in various forms by a small number of samples.

[Modification Examples]

The result derivation unit 218 may output, as information indicating an identification result, only information relating to a form of a target.

Second Example Embodiment

An identification device does not have to include the variable derivation unit 110. An identification device may be configured in such a way that a latent variable vector derived by an encoder, which is configured to derive latent variable vectors mutually convertible by variable conversion, can be acquired with respect to a same target in different forms.

Figure 7:
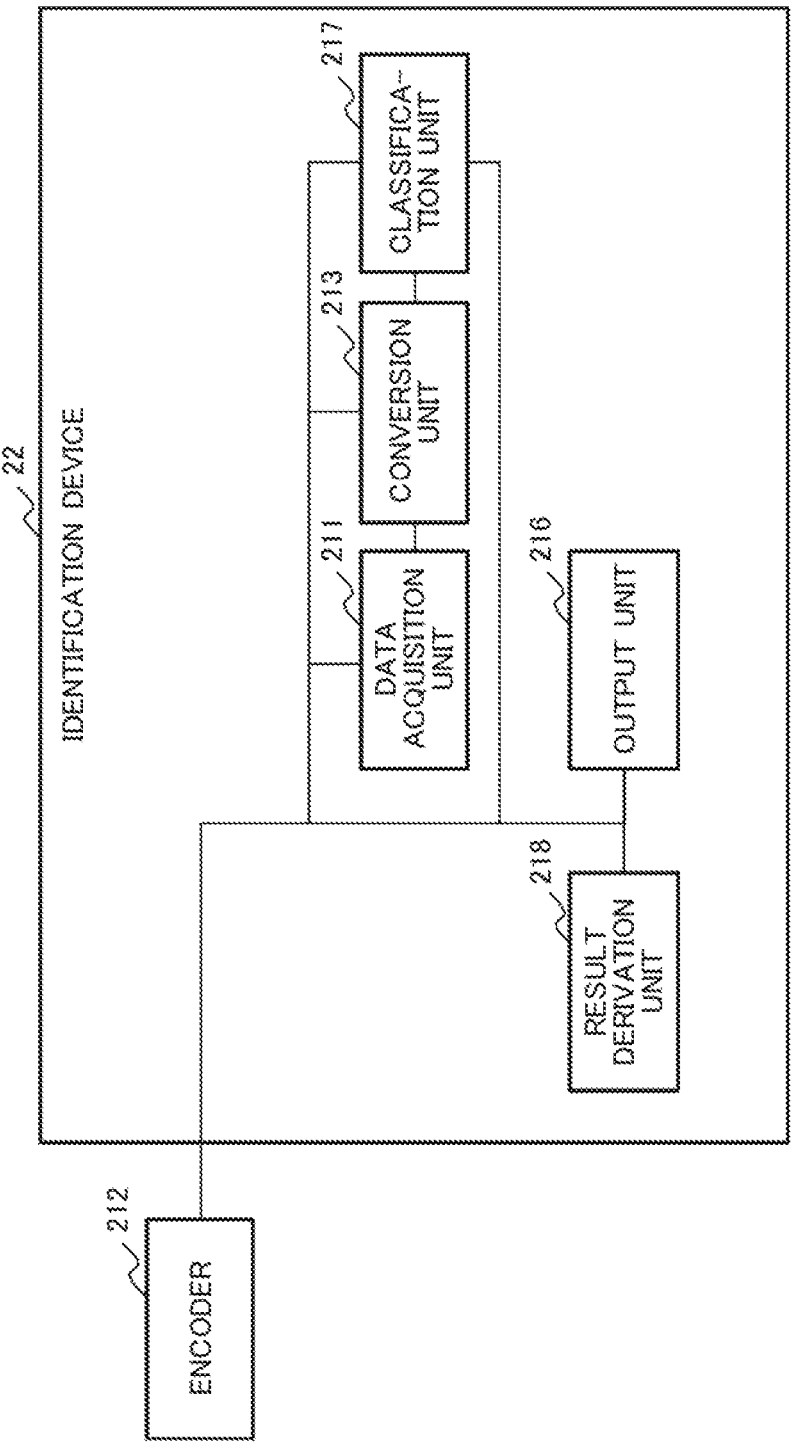
FIG. 7 is a block diagram illustrating a configuration of an identification device according to a second example embodiment of the present invention.

FIG. 7 is a block diagram illustrating a configuration of an identification device 22 according to a second example embodiment of the present invention. The identification device 22 includes a configuration included in the identification unit 210 according to the first example embodiment, specifically, a data acquisition unit 211, a conversion unit 213, a classification unit 217, a result derivation unit 218, and an output unit 216. The identification device 22 is communicably connected to an encoder 212 wiredly or wirelessly.

The encoder 212 is, for example, the encoder 112 according to the first example embodiment. The encoder 112 is configured to derive a latent variable vector by using a neural network in which an optimized parameter is used by learning on variable derivation, which is described in description on the first example embodiment.

The identification device 22 is also able to identify a target in various forms. A reason for this is the same as described in description on the first example embodiment.

The encoder 212 does not have to be the encoder 112 according to the first example embodiment. Another method for configuring the encoder 212 having a desired function (specifically, a function for deriving latent variable vectors mutually convertible by variable conversion with respect to a same target in different forms) is described in the following.

For example, it is possible to generate the encoder 212 by performing learning in which mutually convertible latent variable vectors are respectively correct answers, by using a target in various forms as correct answer data. In this learning, output data to be generated by the decoder 114 according to the first example embodiment may be employed as correct answer data, and a latent variable vector to be output by the conversion unit 113 according to the first example embodiment may be employed as a latent variable vector being a correct answer.

Figure 8:
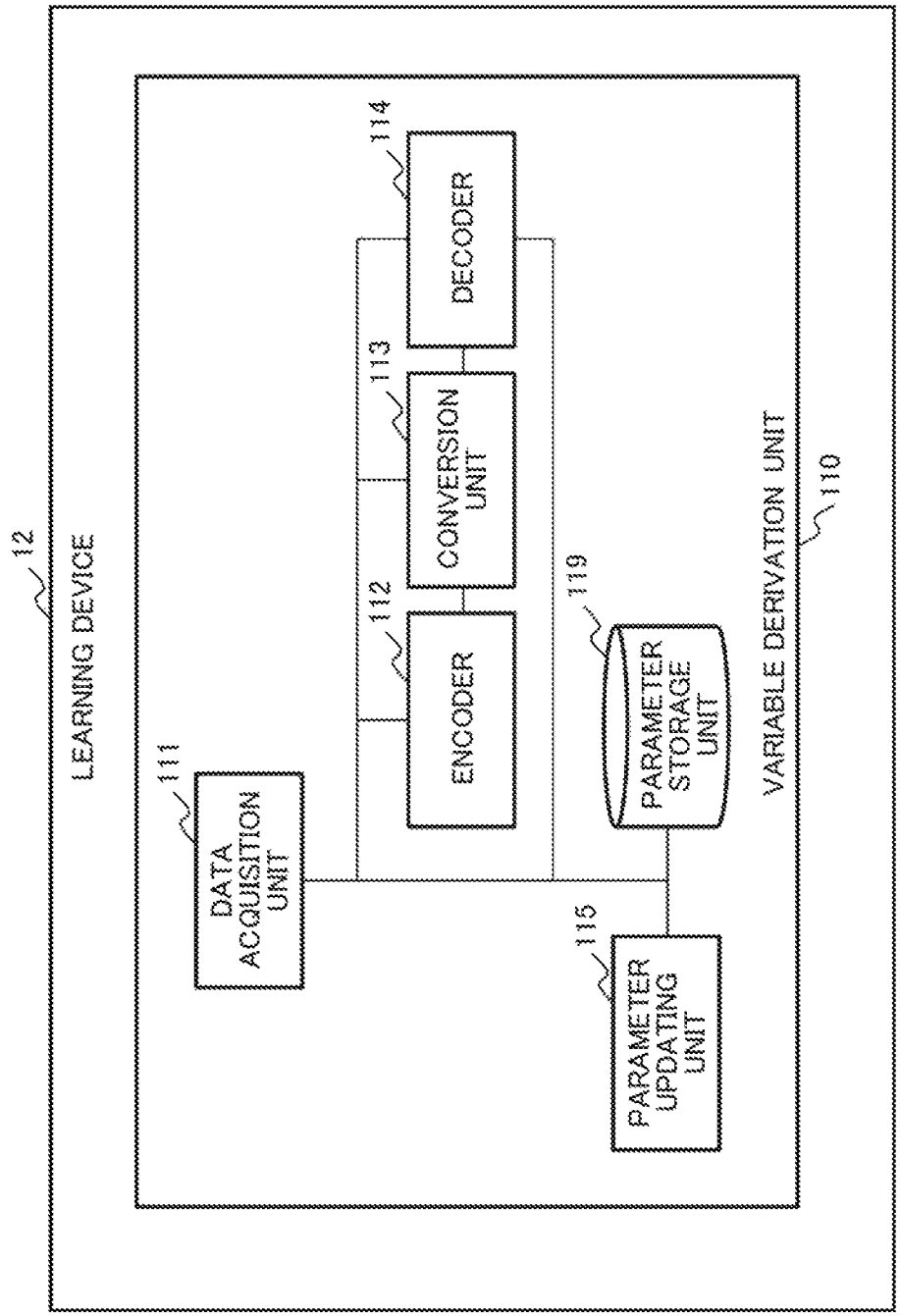
FIG. 8 is a block diagram illustrating a configuration example of a learning device for generating an encoder having a desired function.

As an example, one of methods for generating the encoder 212 having a desired function is the following method. First, a learning device 12 including a variable derivation unit 110 as illustrated in FIG. 8 is prepared. The learning device 12 performs learning on variable derivation described in the first example embodiment by using, as input data, data in which a target TA in various forms is respectively recorded. Combining an encoder 112, a conversion unit 113, and a decoder 114 enables to output output data in which a target TA in various forms is respectively recorded. Next, the learning device 12 derives, by the encoder 112, a latent variable vector from data in which a target TB in a certain form is recorded. Then, the learning device 12 acquires a set of output data in which the target TB in an unlearned form is recorded, and a latent variable vector by converting the latent variable vector by variable conversion and generating the output data.

By using the above-described set, the encoder 212 performs learning for deriving a correct latent variable vector from data in which the target TB in an unlearned form is recorded. Thus, the encoder 212 is able to derive, from data in which the target TB in an unlearned form is recorded, a latent variable vector convertible into a latent variable vector representing the target TB in a learned form.

Data required to be prepared in the above-described method are data in which the target TA in various forms is respectively recorded, and data in which the target TB in a certain form is recorded. It is not necessary to prepare data in which the target TB in an unlearned form is recorded.

Third Example Embodiment

Figure 9:
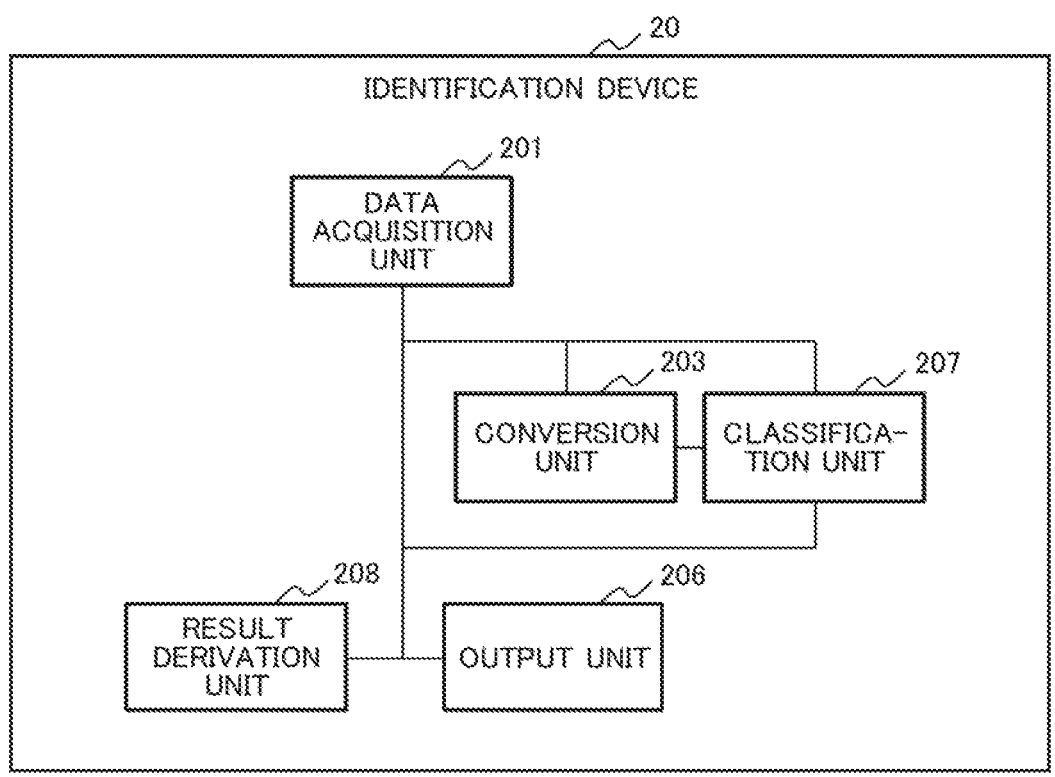
FIG. 9 is a block diagram illustrating a configuration of an identification device according to one example embodiment of the present invention.

An identification device 20 according to one example embodiment of the present invention is described. FIG. 9 is a block diagram illustrating a configuration of the identification device 20. The identification device 20 includes a data acquisition unit 201, a conversion unit 203, a classification unit 207, a result derivation unit 208, and an output unit 206.

The data acquisition unit 201 acquires a first feature value, which is derived from data in which a target to be identified is recorded. The first feature value is a feature value derived by an encoder, which is configured to respectively derive, from data in which a same target in different forms is respectively recorded, feature values mutually convertible by conversion using a conversion parameter having a value according to a difference in the form. A method for mounting the encoder is as described above.

In the present example embodiment, the feature values indicate a set of values to be derived from input data by the encoder. The feature values may also be referred to as information representing a target, representation of data, and the like. Deriving feature values may also be referred to as "extracting feature values". A "latent variable vector" in each of the example embodiments is equivalent to "feature values" in the present example embodiment. A form in which the feature values are held in the learning device 10 does not matter. For example, the feature values may be held in the form of a sequence, or may be respectively held as values of variables to which a name is given.

The conversion unit 203 generates a second feature value by performing conversion using a conversion parameter with respect to the first feature value acquired by the data acquisition unit 201.

The classification unit 207 individually performs classification with respect to each of a plurality of third feature values, and generates a plurality of individual classification results indicating a result of the classification. The plurality of third feature values include at least one second feature value generated by the conversion unit 203. The conversion unit 203 may generate a plurality of second feature values by different conversions, and regard the generated plurality of second feature values as the plurality of third feature values. The plurality of third feature values may be constituted of a first feature value, and at least one second feature value, for example. The plurality of third feature values may include a first feature value, or may not include a first feature value.

The result derivation unit 208 derives, based on the plurality of individual classification results generated by the classification unit 207, identification result information being information relating to at least one of a classification destination and a form of a target to be identified. The identification result information is information indicating at least one of a classification destination and a form of a target to be identified, for example. The identification result information may be information indicating a probability distribution of a class to which the target to be identified may belong.

The output unit 206 outputs the identification result information derived by the result derivation unit 208. The output destination is, for example, a display device, a storage medium, a communication network, and the like.

Figure 10:
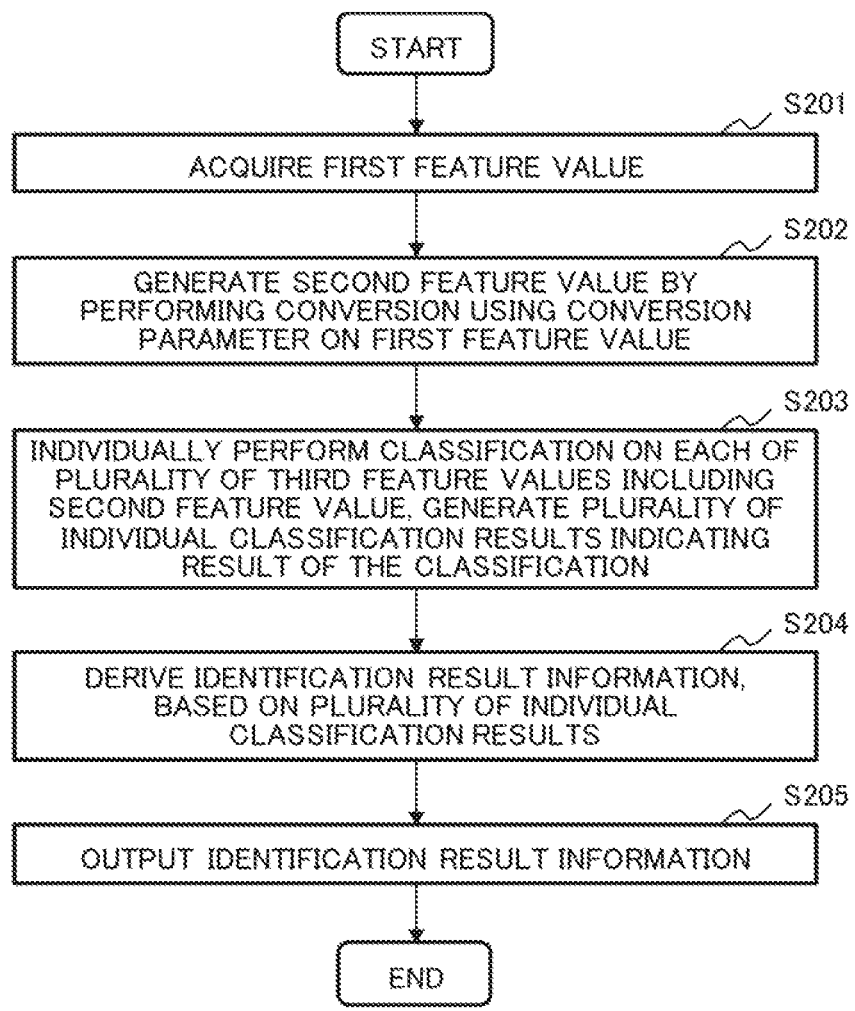
FIG. 10 is a block diagram illustrating a flow of processing of an identification method by an identification device according to one example embodiment of the present invention.

An example of a flow of processing by the identification device 20 is described with reference to the flowchart of FIG. 10. First, the data acquisition unit 201 acquires a first feature value (Step S201). Subsequently, the conversion unit 203 generates a second feature value by performing conversion using a conversion parameter with respect to the first feature value (Step S202). Subsequently, the classification unit 207 individually performs classification with respect to each of a plurality of third feature values including the second feature value, and generates a plurality of individual classification results indicating a result of the classification (Step S203). Subsequently, the result derivation unit 208 derives identification result information, based on the plurality of individual classification results (Step S204). Then, the output unit 206 outputs the identification result information (Step S205).

The identification device 20 is able to identify a target in various forms, even when the number of samples of data in which the target is recorded is small. A reason for this is that the classification unit 207 generates a second feature value different from a first feature value to be derived from data, and the result derivation unit 208 derives identification result information by using a classification result with respect to at least the second feature value.

<Hardware Configuration for Achieving Each Unit of Example Embodiment>

In each of the example embodiments of the present invention described above, a block indicating each of constituent elements of each of devices is indicated by a functional unit. However, a block indicating a constituent element does not necessarily indicate that each of constituent elements is configured by an individual module.

Processing of each of constituent elements may be achieved, for example, by causing a computer system to read and execute a program, which is stored in a computer-readable storage medium and causes the computer system to execute the processing. The "computer-readable storage medium" is, for example, a portable medium such as an optical disc, a magnetic disk, a magneto-optical disk, and a non-volatile semiconductor memory; and a storage device such as a read only memory (ROM) and a hard disk to be incorporated in a computer system. The "computer-readable storage medium" also includes a medium capable of temporarily holding a program, such as a volatile memory inside a computer system; and a medium for transmitting a program, like a communication line such as a network and a telephone line. Further, the above-described program may be the one for achieving a part of the above-described function, or may be the one capable of achieving the above-described function by combination with a program already stored in a computer system.

Figure 11:
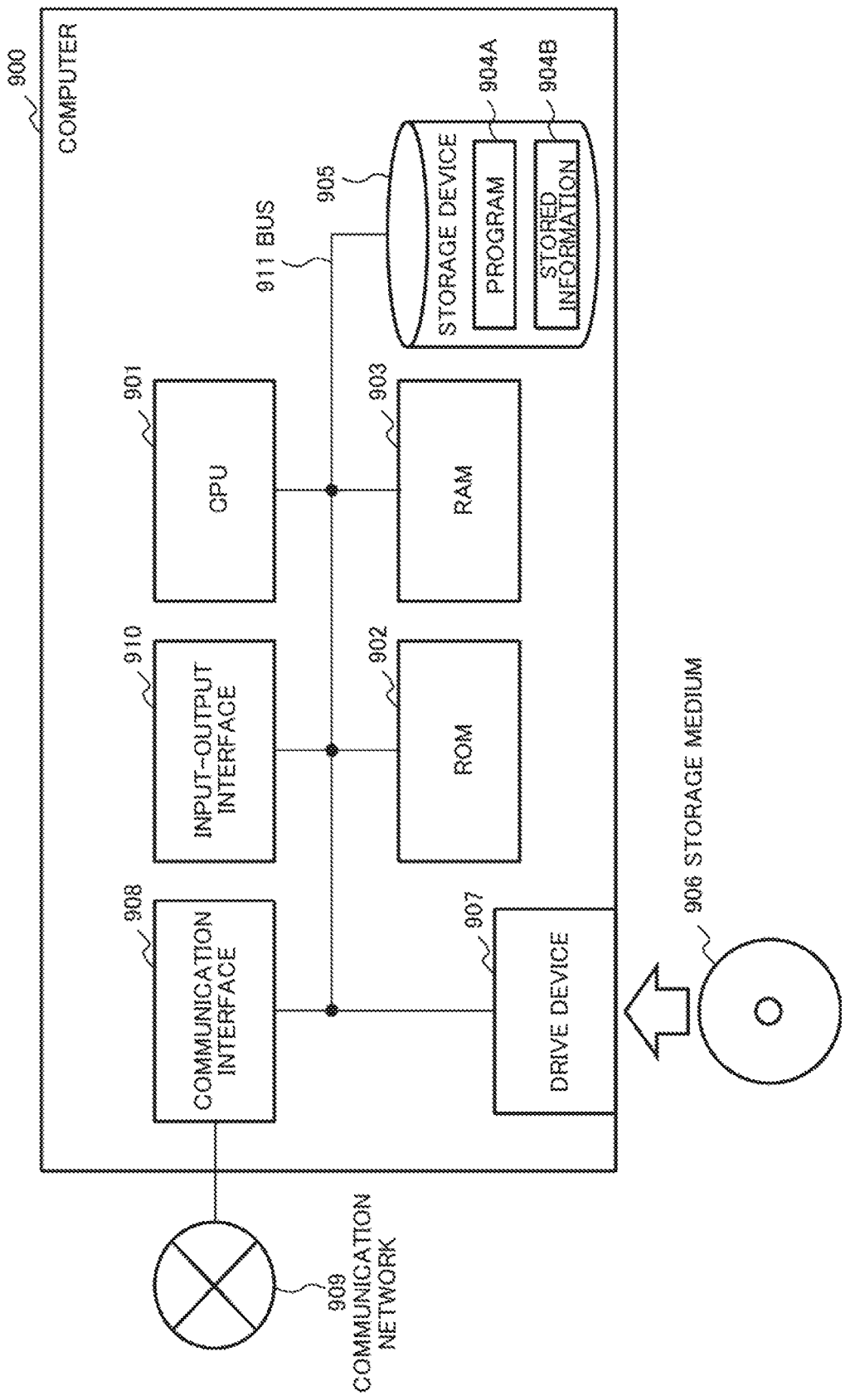
FIG. 11 is a block diagram illustrating an example of a hardware constituting each unit of each example embodiment of the present invention.

The "computer system" is a system including a computer 900 as illustrated in FIG. 11, as one example. The computer 900 includes the following configuration.

One or a plurality of CPUs 901
a ROM 902
a random access memory (RAM) 903
a program 904A and stored information 904B to be loaded to the RAM 903
a storage device 905 for storing the program 904A and the stored information 904B
a drive device 907 for reading and writing with respect to a storage medium 906
a communication interface 908 to be connected to a communication network 909
an input-output interface 910 for inputting and outputting data, and
a bus 911 for connecting the constituent elements.

For example, each of the constituent elements of each of the devices in each of the example embodiments is achieved by causing the CPU 901 to load the program 904A for achieving a function of the constituent element on the RAM 903, and execute the program 904A. The program 904A for achieving a function of each of the constituent elements of each of the devices is stored in advance in the storage device 905 or the ROM 902, for example. The CPU 901 reads the program 904A as necessary. The storage device 905 is, for example, a hard disk. The program 904A may be supplied to the CPU 901 via the communication network 909; or may be stored in advance in the storage medium 906, read to the drive device 907, and supplied to the CPU 901. The storage medium 906 is, for example, a portable medium such as an optical disc, a magnetic disk, a magneto-optical disk, and a non-volatile semiconductor memory.

Various modification examples are available as a method for achieving each of the devices. For example, each of the devices may be achieved by any combination of each individual computer 900 and the program for each of the constituent elements. Alternatively, a plurality of constituent elements included in each of the devices may be achieved by any combination of one computer 900 and the program.

Further, a part or all of each of the constituent elements of each of the devices may be achieved by another general-purpose or dedicated circuitry, a computer and the like, or combination of these. These may be constituted of a single chip, or may be constituted of a plurality of chips to be connected via a bus.

When a part or all of each of the constituent elements of each of the devices is achieved by a plurality of computers, a circuitry, and the like, the plurality of the computers, the circuitry, and the like may be concentratedly disposed or may be distributively disposed. For example, a computer, a circuitry, and the like may be achieved as a configuration in which each of a client-and-server system, a cloud computing system, and the like is connected via a communication network.

A part or all of the above-described example embodiments may be described as the following supplementary notes, but are not limited to the following.

<<Supplementary Notes>>

[Supplementary Note 1]

An identification device including:

an acquisition means for acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form;

a conversion means for generating a second feature value by performing conversion using the conversion parameter with respect to the first feature value;

a classification means for individually performing classification with respect to each of a plurality of third feature values including the second feature value, and generating a plurality of individual classification results indicating a result of the classification;

a result derivation means for deriving, based on the plurality of individual classification results, identification result information being information relating to at least one of a classification destination and a form of the target to be identified; and an output means for outputting the identification result information.

[Supplementary Note 2]

The identification device according to supplementary note 1, wherein the result derivation means derives, as the identification result information, information indicating at least one of a classification destination of the target to be identified, and a form of the target to be identified.

[Supplementary Note 3]

The identification device according to supplementary note 2, wherein the result derivation means specifies an individual classification result including a component having a highest value indicating a likelihood among the plurality of individual classification results, and determines, as a classification destination of the target to be identified, a classification destination indicated by the specified individual classification result.

[Supplementary Note 4]

The identification device according to supplementary note 2 or 3, wherein the result derivation means derives, as the identification result information, information indicating a degree of difference of a form of the target to be identified with respect to a reference form.

[Supplementary Note 5]

The identification device according to supplementary note 4, wherein the result derivation means specifies an individual classification result including a component having a highest value indicating a likelihood among the plurality of individual classification results, and derives information indicating the degree of difference, based on a value of the conversion parameter used in generating the third feature value that provides the specified individual classification result.

[Supplementary Note 6]

The identification device according to any one of supplementary notes 1 to 5, wherein the data are an image, and the target is an object or a person.

[Supplementary Note 7]

The identification device according to any one of supplementary notes 1 to 5, wherein the data are an image to be generated from sensing data by a synthetic aperture radar (SAR), and a difference in the form is a difference resulting from a sensing condition by an SAR.

[Supplementary Note 8]

The identification device according to any one of supplementary notes 1 to 7, further including the encoder.

[Supplementary Note 9]

An identification method including:

acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form;

generating a second feature value by performing conversion using the conversion parameter with respect to the first feature value;

individually performing classification with respect to each of a plurality of third feature values including the second feature value, and generating a plurality of individual classification results indicating a result of the classification;

deriving, based on the plurality of individual classification results, identification result information being information relating to at least one of a classification destination and a form of the target to be identified; and outputting the identification result information.

[Supplementary Note 10]

The identification method according to supplementary note 9, further including deriving, as the identification result information, information indicating at least one of a classification destination of the target to be identified, and a form of the target to be identified.

[Supplementary Note 11]

The identification method according to supplementary note 10, wherein the deriving the identification result information includes specifying an individual classification result including a component having a highest value indicating a likelihood among the plurality of individual classification results, and determining, as a classification destination of the target to be identified, a classification destination indicated by the specified individual classification result.

[Supplementary Note 12]

The identification method according to supplementary note 10 or 11, further including deriving, as the identification result information, information indicating a degree of difference of a form of the target to be identified with respect to a reference form.

[Supplementary Note 13]

The identification method according to supplementary note 12, further including specifying an individual classification result including a component having a highest value indicating a likelihood among the plurality of individual classification results, and deriving information indicating the degree of difference, based on a value of the conversion parameter used in generating the third feature value that provides the specified individual classification result.

[Supplementary Note 14]

The identification method according to any one of supplementary notes 9 to 13, wherein the data are an image, and the target to be identified is an object or a person.

[Supplementary Note 15]

The identification method according to any one of supplementary notes 9 to 13, wherein the data are an image to be generated from sensing data by a synthetic aperture radar (SAR), and a difference in the form is a difference resulting from a sensing condition by an SAR.

[Supplementary Note 16]

A computer-readable storage medium storing a program causing a computer to execute:

acquisition processing of acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form;

conversion processing of generating a second feature value by performing conversion using the conversion parameter with respect to the first feature value;

classification processing of individually performing classification with respect to each of a plurality of third feature values including the second feature value, and generating a plurality of individual classification results indicating a result of the classification;

result derivation processing of deriving, based on the plurality of individual classification results, identification result information being information relating to at least one of a classification destination and a form of the target to be identified; and output processing of outputting the identification result information.

[Supplementary Note 17]

The storage medium according to supplementary note 16, wherein the result derivation processing includes deriving, as the identification result information, information indicating at least one of a classification destination of the target to be identified, and a form of the target to be identified.

[Supplementary Note 18]

The storage medium according to supplementary note 17, wherein the result derivation processing includes specifying an individual classification result including a component having a highest value indicating a likelihood among the plurality of individual classification results, and determining, as a classification destination of the target to be identified, a classification destination indicated by the specified individual classification result.

[Supplementary Note 19]

The storage medium according to supplementary note 17 or 18, wherein the result derivation processing includes deriving, as the identification result information, information indicating a degree of difference of a form of the target to be identified with respect to a reference form.

[Supplementary Note 20]

The storage medium according to supplementary note 19, wherein the result derivation processing includes specifying an individual classification result including a component having a highest value indicating a likelihood among the plurality of individual classification results, and deriving information indicating the degree of difference, based on a value of the conversion parameter used in generating the third feature value that provides the specified individual classification result.

[Supplementary Note 21]

The storage medium according to any one of supplementary notes 16 to 20, wherein the data are an image, and the target to be identified is an object or a person.

[Supplementary Note 22]

The storage medium according to any one of supplementary notes 16 to 20, wherein the data are an image to be generated from sensing data by a synthetic aperture radar (SAR), and a difference in the form is a difference resulting from a sensing condition by an SAR.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

REFERENCE SIGNS LIST

12 Learning device
20, 21, 22 Identification device
110 Variable derivation unit
111 Data acquisition unit
112 Encoder
113 Conversion unit
114 Decoder
115 Parameter updating unit
118 Latent variable storage unit
119 Parameter storage unit
210 Identification unit
201, 211 Data acquisition unit
212 Encoder
203, 213 Conversion unit
206, 216 Output unit
207, 217 Classification unit
208, 218 Result derivation unit
900 Computer
901 CPU
902 ROM
903 RAM
904A Program
904B Stored information
905 Storage device
906 Storage medium
907 Drive device
908 Communication interface
909 Communication network
910 Input-output interface
911 Bus

The invention claimed is:

1. An identification device comprising:
at least one memory storing instructions; and
at least one processor configured to access the at least one memory and execute the instructions to:
acquire a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form;
generate a second feature value by performing conversion using the conversion parameter with respect to the first feature value;
perform classification with respect to each of a plurality of third feature values including the second feature value individually;
generate a plurality of individual classification results indicating a result of the classification;
derive, based on the plurality of individual classification results, identification result information being information relating to at least one of a classification destination and a form of the target to be identified; and
output the identification result information.

2. The identification device according to claim 1, wherein the at least one processor is further configured to execute the instructions to:
derive, as the identification result information, information indicating at least one of a classification destination of the target to be identified, and a form of the target to be identified.

3. The identification device according to claim 2, wherein the at least one processor is further configured to execute the instructions to:
specify an individual classification result including a component having a highest value indicating a likelihood among the plurality of individual classification results; and
determine, as a classification destination of the target to be identified, a classification destination indicated by the specified individual classification result.

4. The identification device according to claim 2, wherein the at least one processor is further configured to execute the instructions to:
derive, as the identification result information, information indicating a degree of difference of a form of the target to be identified with respect to a reference form.

5. The identification device according to claim 4, wherein specify an individual classification result including a component having a highest value indicating a likelihood among the plurality of individual classification results; and
derive information indicating the degree of difference, based on a value of the conversion parameter used in generating the third feature value that provides the specified individual classification result.

6. The identification device according to claim 1, wherein the data are an image, and the target is an object or a person.

7. The identification device according to claim 1, wherein the data are an image to be generated from sensing data by a synthetic aperture radar (SAR), and a difference in the form is a difference resulting from a sensing condition by an SAR.

8. The identification device according to claim 1, further comprising the encoder.

9. An identification method comprising:
acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form;
generating a second feature value by performing conversion using the conversion parameter with respect to the first feature value;
individually performing classification with respect to each of a plurality of third feature values including the second feature value, and generating a plurality of individual classification results indicating a result of the classification;
deriving, based on the plurality of individual classification results, identification result information being information relating to at least one of a classification destination and a form of the target to be identified; and
outputting the identification result information.

10. The identification method according to claim 9, further comprising
deriving, as the identification result information, information indicating at least one of a classification destination of the target to be identified, and a form of the target to be identified.

11. The identification method according to claim 10, wherein
the deriving the identification result information includes specifying an individual classification result including a component having a highest value indicating a likelihood among the plurality of individual classification results, and determining, as a classification destination of the target to be identified, a classification destination indicated by the specified individual classification result.

12. The identification method according to claim 10, further comprising
deriving, as the identification result information, information indicating a degree of difference of a form of the target to be identified with respect to a reference form.

13. The identification method according to claim 12, further comprising
specifying an individual classification result including a component having a highest value indicating a likelihood among the plurality of individual classification results, and deriving information indicating the degree of difference, based on a value of the conversion parameter used in generating the third feature value that provides the specified individual classification result.

14. The identification method according to claim 9, wherein
the data are an image, and the target to be identified is an object or a person.

15. The identification method according to claim 9, wherein
the data are an image to be generated from sensing data by a synthetic aperture radar (SAR), and a difference in the form is a difference resulting from a sensing condition by an SAR.

16. A non-transitory computer-readable storage medium storing a program causing a computer to execute:
acquisition processing of acquiring a first feature value derived from data in which a target to be identified is recorded by an encoder which is configured in such a way as to derive, from data in which a same target in each of different forms is recorded, each of feature values mutually convertible by conversion using a conversion parameter having a value according to a difference in the form;
conversion processing of generating a second feature value by performing conversion using the conversion parameter with respect to the first feature value;
classification processing of individually performing classification with respect to each of a plurality of third feature values including the second feature value, and generating a plurality of individual classification results indicating a result of the classification;
result derivation processing of deriving, based on the plurality of individual classification results, identification result information being information relating to at least one of a classification destination and a form of the target to be identified; and
output processing of outputting the identification result information.

17. The storage medium according to claim 16, wherein the result derivation processing includes deriving, as the identification result information, information indicating at least one of a classification destination of the target to be identified, and a form of the target to be identified.

18. The storage medium according to claim 17, wherein the result derivation processing includes specifying an individual classification result including a component having a highest value indicating a likelihood among the plurality of individual classification results, and determining, as a classification destination of the target to be identified, a classification destination indicated by the specified individual classification result.

19. The storage medium according to claim 17, wherein the result derivation processing includes deriving, as the identification result information, information indicating a degree of difference of a form of the target to be identified with respect to a reference form.

20. The storage medium according to claim 19, wherein the result derivation processing includes specifying an individual classification result including a component having a highest value indicating a likelihood among the plurality of individual classification results, and deriving information indicating the degree of difference, based on a value of the conversion parameter used in generating the third feature value that provides the specified individual classification result.

* * * * *